US008886791B2

(12) United States Patent
Suchter et al.

(10) Patent No.: US 8,886,791 B2
(45) Date of Patent: Nov. 11, 2014

(54) GENERATING ALERTS BASED ON MANAGED AND UNMANAGED DATA

(75) Inventors: Sean Andrew Suchter, Los Altos Hills, CA (US); Charles C. Carson, Jr., Cupertino, CA (US); Lynn Rowe Girotto, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 118 days.

(21) Appl. No.: 12/833,000

(22) Filed: Jul. 9, 2010

(65) Prior Publication Data
US 2012/0011242 A1  Jan. 12, 2012

(51) Int. Cl.
*G06F 15/173*  (2006.01)
*G06F 11/30*  (2006.01)
*H04L 12/24*  (2006.01)

(52) U.S. Cl.
CPC ........ *G06F 11/3006* (2013.01); *G06F 11/3065* (2013.01); *H04L 41/0604* (2013.01); *H04L 41/0686* (2013.01)
USPC ............ 709/224; 709/203; 709/204; 709/205

(58) Field of Classification Search
USPC ........................... 709/203, 204, 205, 206, 228
See application file for complete search history.

(56) References Cited

U.S. PATENT DOCUMENTS

| 7,444,383 | B2* | 10/2008 | Horvitz ......................... 709/207 |
| 7,606,818 | B2 | 10/2009 | Bachmann et al. |
| 7,653,715 | B2 | 1/2010 | Bobde et al. |
| 7,676,753 | B2* | 3/2010 | Bedingfield .................. 715/745 |
| 2006/0168592 | A1* | 7/2006 | Andrews et al. ............. 719/318 |
| 2008/0052407 | A1* | 2/2008 | Baudino et al. .............. 709/238 |
| 2009/0024452 | A1* | 1/2009 | Martinez et al. ............... 705/10 |
| 2009/0204666 | A1 | 8/2009 | Sana et al. |
| 2011/0231216 | A1* | 9/2011 | Fyke et al. .................... 705/7.12 |

OTHER PUBLICATIONS

Indulska, et al., "Scalable Location Management for Context-Aware Systems", Retrieved at << http://citeseerx.ist.psu.edu/viewdoc/download?doi=10.1.1.59.9189&rep=rep1&type=pdf >>, Distributed Applications and Interoperable Systems, 4th IFIP WG6.1 International Conference, DAIS, Nov. 17-21, 2003, pp. 12.
Indulska, et al., "Location Management in Pervasive Systems", Retrieved at << http://www.acs.org.au/documents/public/crpit/CRPITV21WIndulska.pdf >>, Conferences in Research and Practice in Information Technology Series, vol. 34, Proceedings of the Australasian information security workshop conference on ACSW frontiers, vol. 21, 2003, pp. 9.
"EMCOM National Emergency Alert Notification System", Retrieved at << http://emcomus.org/index1.html >>, Retrieved Date: Apr. 12, 2010, pp. 13.
"Regional ITS Concept", Retrieved at << http://www.mwcog.org/uploads/committee-documents/olddXF820070315123330.pdf >>, Retrieved Date: Apr. 12, 2010, pp. 16.

* cited by examiner

*Primary Examiner* — Liangche A Wang
*Assistant Examiner* — Cheikh Ndiaye
(74) *Attorney, Agent, or Firm* — Dan Choi; Judy Yee; Micky Minhas

(57) ABSTRACT

Concepts and technologies are described herein for generating informational alerts. Notifications are received from both unmanaged devices and managed services. The received notifications may be annotated to create annotated notations. The notifications may be annotated with privacy data that defines the terms under which the notifications may be provided to others. The notifications may also be annotated with compensation data that defines the financial terms under which the notifications may be provided to others. Standing and ad-hoc queries may be performed against the annotated notifications. The results of the queries may be provided to one or more user devices as an informational alert.

9 Claims, 5 Drawing Sheets

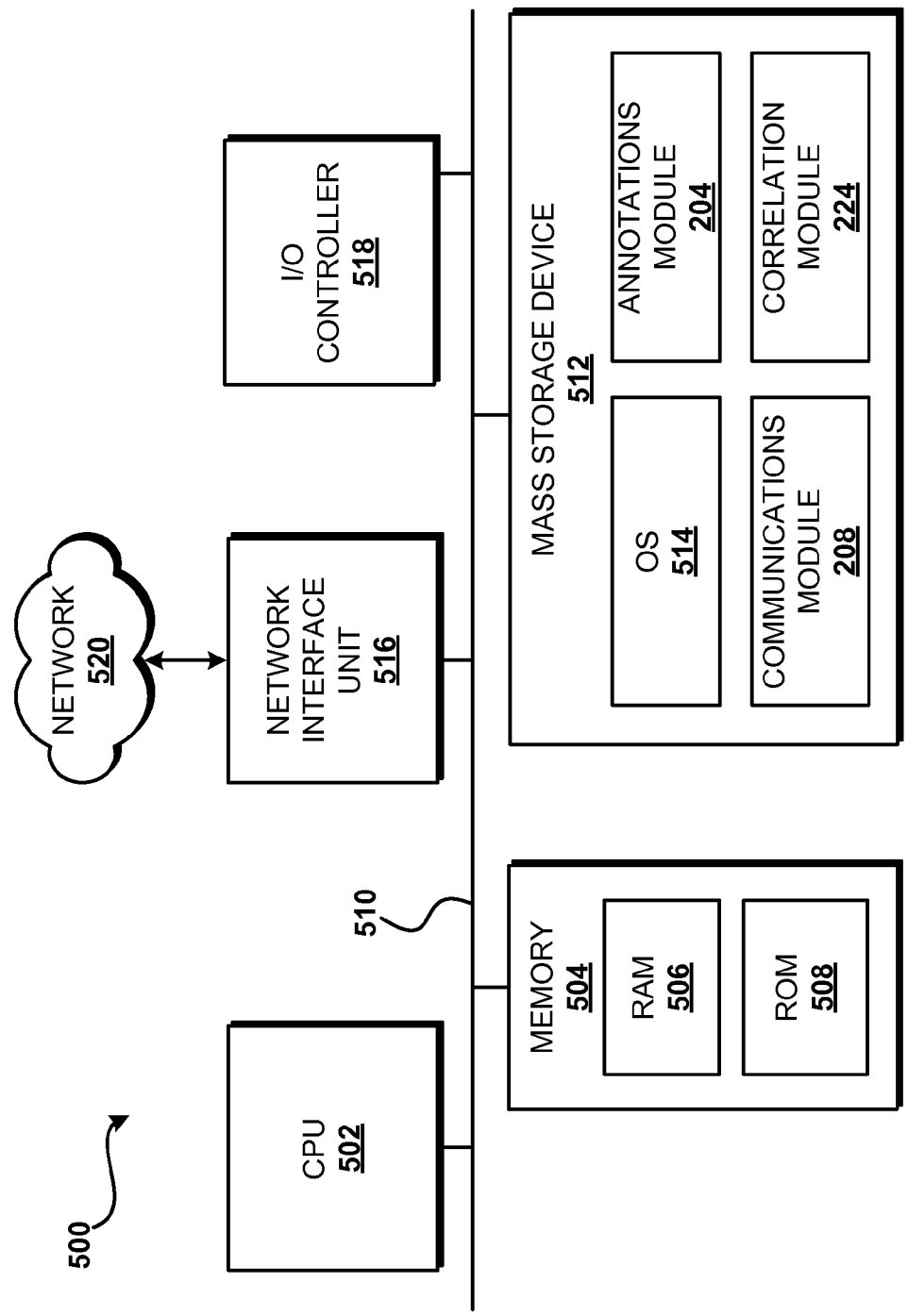

GENERATING ALERTS BASED ON MANAGED AND UNMANAGED DATA

BACKGROUND

The proliferation of computing devices throughout contemporary society has resulted in the generation and collection of massive amounts of data. Virtually every aspect of daily life is now in some way tied to or observed by some form of computing device. By way of example, today's smartphones and other devices generate significant amounts of data relating to a user's communications (such as phone calls, e-mail/electronic communications, etc.), a user's whereabouts/travel habits (via GPS or other such global positioning service), and a user's daily routine (such as their shopping habits, daily schedule, etc.). The vast majority of this data is not, however, utilized in any meaningful way. This is due in large part to the difficulty in aggregating and accessing the massive amount of data that is currently being generated.

It is with respect to these and other considerations that the disclosure made herein is presented.

SUMMARY

Concepts and technologies are described herein for, among other things, generating informational alerts based upon an aggregation of data received from devices and services. Through an implementation of the technologies and concepts presented herein, the aggregated data can be utilized to generate informational alerts that are provided to users, thereby permitting the users to make better use of a large volume of collected data than previously possible.

According to one aspect disclosed herein, notifications are received from unmanaged devices and managed data services (which may be referred to herein as "data sources"). The received notifications are annotated to create annotated notifications. For instance, the received notifications may be annotated with privacy data. The privacy data may specify the terms under which the notifications might be provided to others. According to other aspects, the received notifications may also be annotated with compensation data. The compensation data may specify the financial terms upon which the notifications might be provided to others.

According to other aspects, standing and ad-hoc queries may be performed against the annotated notifications. The results of the queries may be transmitted to one or more user devices as an informational alert. The informational alert might be provided in accordance with the privacy data and the compensation data utilized to annotate the received notifications. For instance, compensation might be provided to an owner or operator of an unmanaged device or a managed service for the provision of notifications. Similarly, a charge may be made to a consumer of informational alerts generated using the technologies presented herein.

According to other aspects, the received notifications might be processed in order to determine whether a disparity exists between the notifications received from the unmanaged devices and the notifications received from the managed services. If a disparity exists, an informational alert might be generated and transmitted to a user device. According to other aspects, the annotated notifications might be filtered and an accuracy rating might be ascribed to the notifications.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a computer architecture diagram showing an illustrative computer hardware and software architecture for a computing system capable of implementing the embodiments presented herein.

DETAILED DESCRIPTION

Figure 1:
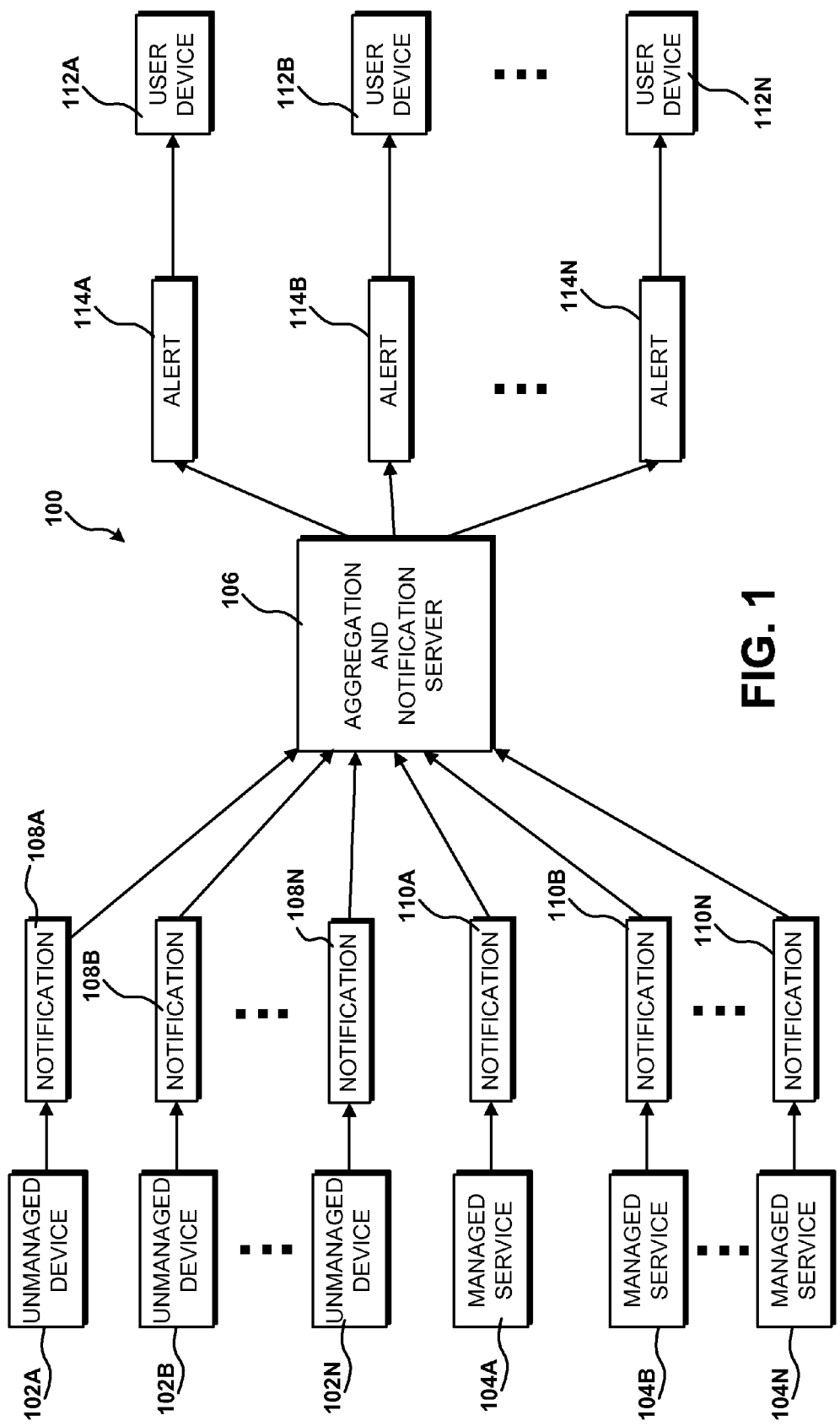
FIG. 1 is a network and software architecture diagram showing aspects of several devices and software components provided herein.

The following detailed description is directed to concepts and technologies for providing informational alerts based upon notifications received from unmanaged devices and managed services. Notifications may be received from both unmanaged devices and managed services. The received notifications may be annotated to create annotated notations. The notifications may be annotated with privacy data that defines the terms under which the notifications may be provided to others. The notifications may also be annotated with compensation data that defines the financial terms under which the notifications may be provided to others. Standing and ad-hoc queries may be performed against the annotated notifications. The results of the queries may be provided to one or more user devices as an informational alert. Additional aspects of the concepts and technologies presented herein will be described below with reference to FIGS. 1-5.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for generating informational alerts based on managed and unmanaged data will be presented.

Referring now to FIG. 1, a network and software architecture diagram will be described that shows aspects of several devices and software components provided herein. As shown in FIG. 1, various unmanaged devices 102A-102N routinely collect and/or generate data over the course of their normal operation. An unmanaged device is a device that can collect and provide data without requiring continual management by a user. Examples of unmanaged devices 102A-102N include, but are not limited to, cellular phones, traffic cameras, global positioning system ("GPS") devices, road sensors, weather cameras, and vending machines. It should be understood, however, that any device with the capacity to collect and/or generate data without requiring continual management by a user may be considered an unmanaged device.

The various unmanaged devices 102A-N, over the course of their normal operation, generally collect, generate, and/or access data in an unmanaged fashion. By nature of their independent operation, the data collected by these unmanaged devices (such as location, speed traveling, personal scheduling information, etc.) is generally not collected and considered in a unified fashion. However, in the present disclosure, each of the unmanaged devices 102A-N may transmit a notification 108A-108N, respectively, or a series of notifications, to a central aggregation and notification server 106. As will be described in detail below, the central aggregation and notification server 106 is a data server or a plurality of connected data servers capable of receiving, storing, and analyzing the notifications 108A-108N. It should be noted that while in one embodiment these notifications are preferably data items or collections of data items generated by or otherwise possessed by an unmanaged device 102A-N, notifications 108A-N can encompass practically any data item or data set.

In a somewhat similar fashion, the managed services 104A-104N also generate data. However, the managed services 104A-104N generate data that is managed. For instance, the managed services 104A-104N might generate airline flight arrival/departure information, traffic information, and phone communications logs. It should be understood that practically any computing device or data server capable of transmitting managed data might be utilized in the manner disclosed herein. According to embodiments, the managed services 104A-N transmit notifications 110A-110N containing the managed data to the aggregation and notification server 106. In one embodiment this transmission occurs over a wide area network, such as the Internet, though it should be readily understood that alternate communication networks could be similarly utilized.

Upon receiving the notifications 108A-108N from the unmanaged devices 102A-102N and the notifications 110A-110N from the managed services 104A-104N, the central aggregation and notification server 106 aggregates and correlates the notifications 108A-108N and 110A-110N. The aggregation and notification server 106 might also execute standing or ad-hoc queries against the aggregated notifications and generate alerts 114A-114N based upon the results of the queries. The alerts 114A-114N (which may be referred to herein as "informational alerts") may then be transmitted to a user device 112A-112N, respectively. Additional details regarding this process will be provided below.

As will also be described in greater detail below, the notifications 108A-108N and 110A-110N may be annotated with privacy data. For instance, a sender of a notification 108A might indicate that the notification 108A cannot be shared with others or that the notification 108A can be shared if aggregated with notifications from others Annotating the notifications 108A-108N with privacy data in this manner enables the restriction of the utilization and re-transmission of the various notifications 108A-108N and 110A-110N. In a similar fashion, the notifications 108A-108N and 110A-110N may be annotated with compensation data in order to enable the implementation of a compensation scheme for the transmission and receipt of the notifications 108A-108N and 110A-110N. For instance, a sender of a notification 110A might indicated that the notification 110A can only be shared with others in exchange for a monetary payment. Additional details regarding this process will be described in greater detail below.

As described briefly above, the alerts 114A-114N may be transmitted to the user devices 112A-112N. The user devices 112A-N may include unmanaged individual devices (such as cellular phones, personal computers, etc.), as well as managed services such as servers. In one embodiment, alerts 114A-114N may be transmitted in response to ad-hoc or standing queries. The alerts 114A-114N may be delivered via various means, such as short messaging system messages, e-mail, and other pull and push technologies.

In one embodiment, the transmission of the notifications 108A-108N, as well as the other transmissions discussed herein, occurs over a wide area network such as the Internet, utilizing encryption protocols, though it should be readily understood that alternate communication networks (such as cellular networks and local area networks) could be similarly utilized. Additionally, it should be appreciated that while the aggregation and notification server 106 is illustrated in FIG. 1 as a single server, multiple server computers connected by way of multiple networks might be utilized. For instance, the aggregation and notification server 106 might be operated as a collection of server computers operated by various federated organizations. Other implementations might also be utilized.

Turning now to FIGS. 2A-2D, various components employed in one embodiment presented herein for generating informational alerts will be described in detail. In particular, FIG. 2A illustrates aspects of the operation of an unmanaged device 102, which, as described in detail above, collects and/or generates data in an unmanaged fashion. As shown in FIG. 2A, a client application 202 executes on the unmanaged device 102. The client application 202 and generates notifications 102 based upon data collected by, accessible to, or residing in the unmanaged device 102.

FIG. 2B illustrates aspects of the configuration of a managed service 104, which as described in detail above, collects and/or generates data in a managed fashion. As shown in FIG. 2B, a client application 204 executes on the managed service 104 that application enables the managed service 104 to generate notifications 110 based upon data collected by, accessible by, or residing in the managed service 104.

Figure 2:
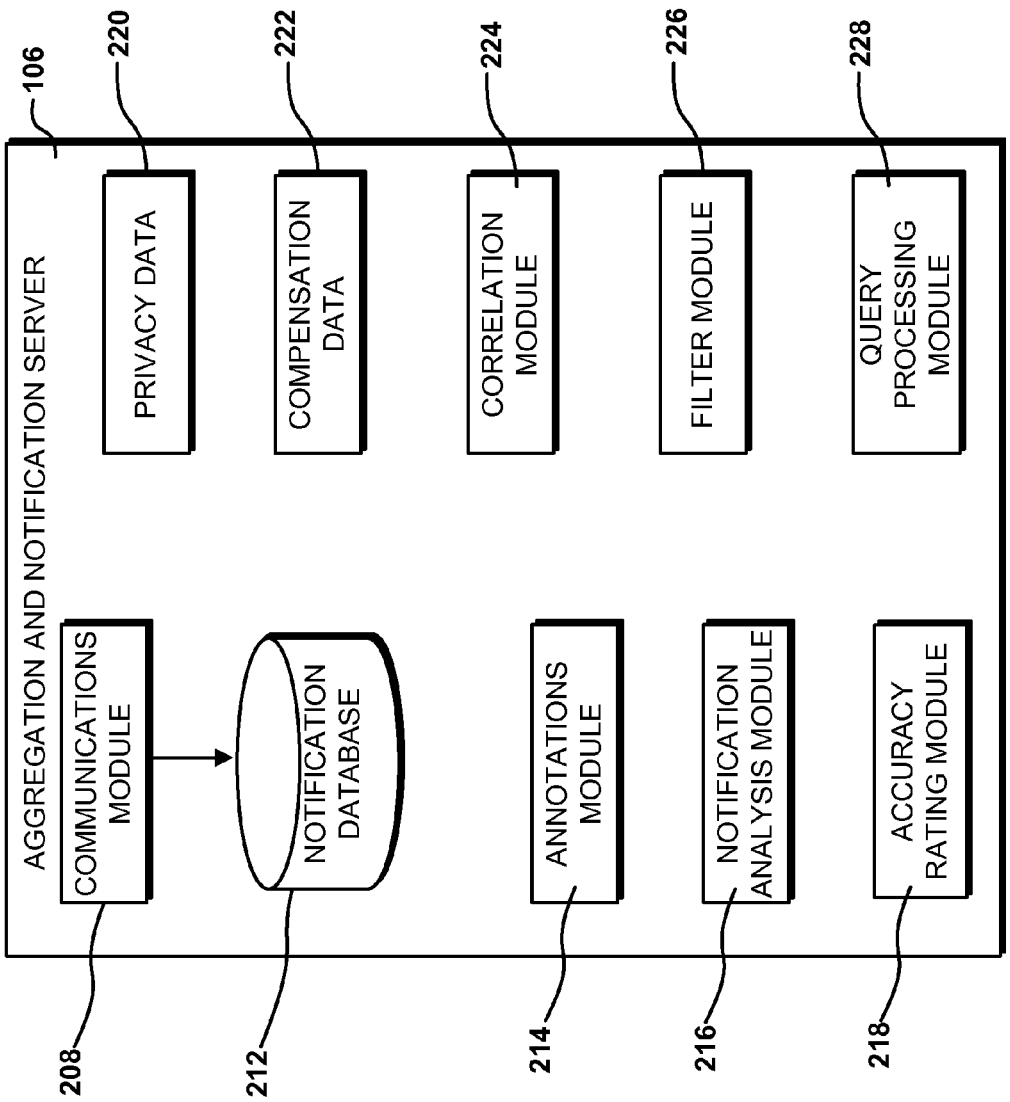
FIGS. 2A-2D are computer hardware and software architecture diagrams showing aspects of an unmanaged device, a managed service, a user device, and an aggregation and notification server provided in various embodiments disclosed herein.

FIG. 2C shows aspects of the configuration of a user device 112, which, as described in detail above, is configured to receive an alert 114. As shown in FIG. 2, a client application 206 executes upon the user device 112. The client application 206 enables the user device 112 to receive and process the alerts 114. It should be noted that although the unmanaged device 102, managed service 210, and user device 112 are depicted as independent elements, the functionalities and operation of each of these devices may be present in a single, unified device. For example, an unmanaged device 102 may also function as a user device 112, inasmuch as it receives alerts 114.

FIG. 2D shows aspects of the configuration and operation of the aggregation and notification server 106 according to one embodiment disclosed herein. As shown in FIG. 2D, the aggregation and notification server 106 may include a communications module 208 for receiving the various notifications 108A-N and 110A-N. The communications module 208 might also be configured to store the notifications 108A-108N and 110A-110N in a notification database 212. The notification database 212 stores the notifications 108A-108N received from the unmanaged devices 102A-102A and the notifications 110A-110N received from the managed services 104A-104N. The notification database 212 might also be used to store data during and following the processes described herein for aggregating and annotating the notifications 108A-108N and 110A-110N and for storing the alerts 114A-114N. The notification database 212 might also be utilized to store other data.

As shown in FIG. 2D, the aggregation and notification server 106 might also include an annotations module 214. The annotations module 214 is an executable software component configured for annotating received notifications 108A-108N and 110A-110N based on various parameters. In one embodiment, the annotations module 214 annotates notifications with privacy data 220. As discussed briefly above, the unmanaged devices 102A-102N and managed services 104A-104N that transmit notifications 108A-108N and 110A-110N, respectively, to the aggregation and notification server 106 may establish privacy preferences which govern the use and distribution of the various notifications they contribute. By way of example, the user of an unmanaged device 102 may elect to restrict any personal or identifying elements associated with the notifications they transmit. In doing so, the notifications generated by the user's unmanaged device 102 can be utilized while still protecting an individual's identity.

In an alternative embodiment, the privacy data 220 may restrict the dissemination of certain notifications 108A-108N or the notifications 110A-110N to a particular group of recipients. In this manner, the notifications 108A-108N and 110A-110N may be shared with trusted users or entities, while restricting access by untrusted or unverified parties.

In a similar vein, the annotations module 214 of the aggregation and notification server 106 might further serve to annotate the notifications 108A-108N and 110A-110N based upon various compensation data 222. In this manner, a variety of compensation and incentive-based schemes may be implemented which serve to encourage various sources of unmanaged and managed notifications to contribute their data. By way of example, in one embodiment an unmanaged device 102 or managed service 104 may be credited a specific monetary amount for each notification 108 or 104, respectively, that is contributed. This credit may vary based upon the value and reliability of the received notification. In an alternate embodiment, a user or administrator of an unmanaged device 102 or managed service 104 may be provided with a flat compensation rate based upon their respective notification contribution history and preferences. In yet another embodiment, a user or administrator of an unmanaged device 102 or managed service 104 may be provided with additional access to certain information and/or notifications in exchange for the contribution of their respective notifications.

The aggregation and notification server 106 might also include a notification analysis module 216 for analyzing the content of the received notifications 108A-N and 110A-N. In one embodiment, the notification analysis module 216 determines whether disparities exist between the notifications 108A-N and the notifications 110A-N. For example, the notification analysis module 216 may determine that while notifications 110 received from a managed service 104 (such as a traffic report) indicate that no traffic problems exist on a particular road, various notifications 108 received from one or more unmanaged devices 102A-102N (in the form of individual notifications 108 indicating that various unmanaged devices 102 are moving slowly along the same road) may indicate that traffic congestion may in fact be present.

The aggregation and notification server 106 might also include a correlation module 224 that correlates the various received notifications 108A-108N and 110A-110N to create a set of aggregated notifications. Aggregated notifications are notifications that include some combination of the notifications 108A-108N received from unmanaged devices 102A-102N and the notifications 110A-110N received from unmanaged devices 104A-104N. By way of example, a particular user's location and speed information (received from an unmanaged device 102) may be aggregated with airline status information (received from a managed service 104) and information regarding the parking capacity at an airport parking lot (also received from a managed service 104), as well as the speed and concentration of individual devices present in the airport's security line (received from unmanaged devices 102 such as cell phones). The aggregated notifications might be utilized to create an alert 114 advising a user of a user device 112 as to whether the user should utilize an expedited parking service in order to arrive at their airline gate in time for their scheduled flight. Other scenarios are also contemplated.

The aggregation and notification server 106 might also include a filter module 226. The filter module 226 provides functionality for filtering the notifications 108A-108N and 110A-110N and, potentially, aggregated notifications. In one embodiment, for instance, the filter module 226 may a filter to the notifications so that only notifications containing information of a particular origin (such as from members of a particular company or group) are considered. In an alternate embodiment, a filter may be applied wherein only aggregated notifications containing information originating during a particular time period (such as between the hours of 7 a.m. to 9 a.m., or within the past week) are considered. In this manner, the filter module 226 allows notifications to be filtered in order to provide more pertinent and insightful information to a user.

The aggregation and notification server 106 may also include an accuracy rating module 218. The accuracy rating module 218 provides functionality for ascribing a reliability rating to a particular notification or group of notifications. In order to provide this functionality, the accuracy rating module 218 may consider historical data. The accuracy rating module 218 might also compare past trends with currently received notifications 108A-108N and 110A-110N. The module 218 may utilize the historical data and past trends to determine an accuracy rating for the notification 108A-108N and 110A-110N. By way of example, as referenced above, a concentration of slow moving unmanaged devices 102 on a particular road may indicate traffic congestion. Using historical data, an accuracy rating (based on a variety of factors such as the concentration of devices, their average speed, and the likelihood of traffic at a particular time on a particular road) is ascribed, thereby indicating to the user to what degree the aggregated notification can or should be relied upon.

The aggregation and notification server 106 might also include query processing module 228. As discussed above, in one embodiment, the alerts 114A-N are transmitted to various user devices 112A-N in response to a query by a particular user device 112A-112N. The query processing module 228 may be configured to process the queries and to transmit an alert 114 in response to the queries. By way of example, an individual user device 112A may request driving directions to a particular location. Utilizing the notifications 108A-108N and 110A-10N, the aggregation and notification server 106 may create and transmit an alert 114 (which may include data from both unmanaged devices 102 and managed data services 104) representing an optimal driving route. In an alternate embodiment, the transmission of the alerts 114 can be pushed to a user device 112 in response to a standing query. By way of example, a user may define a standing query for alerts regarding traffic on the user's path to the airport. Notifications 108A-108N from a concentration of slow moving unmanaged devices 102A-102N on a particular road may indicate a traffic incident. If this road is on the user's route to the airport, and it is known (based upon a notification 110 from a managed service 104 that maintains the user's schedule) that the user has a flight scheduled that day, an alert may be pushed to the user's device 112 alerting the user of the traffic incident.

It should be appreciated that the software architecture for the aggregation and notification server 106 shown in FIG. 2D is illustrative and that other implementations might be utilized. For instance, more of fewer software components might be utilized and the software components might be distributed over multiple server computers and networks. Additionally, as discussed above, the functionality provided by the aggregation and notification server 106 might be provided by federated organizations that operate independently and in concert with one another.

Figure 3:
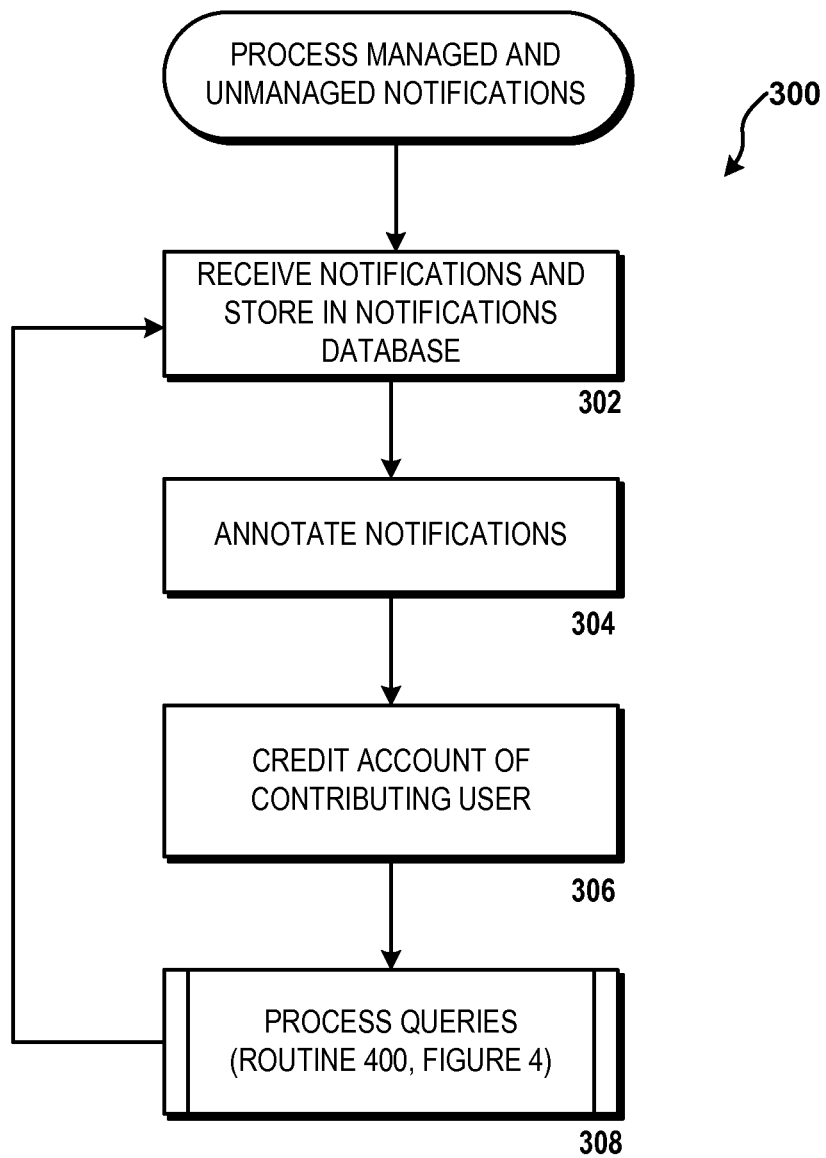
FIG. 3 is a flow diagram illustrating aspects of operations for receiving and processing notifications according to one embodiment disclosed herein.

Turning now to FIG. 3, a flow diagram will be described showing a routine 300 that illustrates various operations performed by the aggregation and notification server 106 in one embodiment disclosed herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at block 302 where the aggregation and notification server 106 receives the notifications 108A-108N from the unmanaged devices 102A-102N. The aggregation and notification server 106 also receives the notifications 110A-110N from the managed services 104A-104N. As discussed above, the aggregation and notification server 106 may store the notifications 108A-108N and 110A-110N in the notification database 212. From operation 302, the routine 300 proceeds to operation 304.

At operation 304, the annotations module 214 of the aggregation and notification server 105 annotates the received notifications 108A-108N and 110A-110N. As discussed above, the annotations module 214 might utilize the privacy data 220 and the compensation data 222 to annotate the notifications 108A-108N and 110A-110N. When the compensation data 222 is utilized to annotate the notifications, an account of an entity or user that contributed the notifications might be credited at operation 306. Credit might be applied upon receipt of a qualifying notification or on a pre-determined schedule.

From operation 306, the routine 300 proceeds to operation 308, where ad-hoc or standing queries are processed by the query processing module 228. This process is described below with regard to FIG. 4. From operation 308, the routine 300 proceeds to operation 302, where the aggregation and notification server 106 continues to receive notifications 108A-108N and 110A-110N, to store the received notifications, to annotate the notifications, and to process queries.

Figure 4:
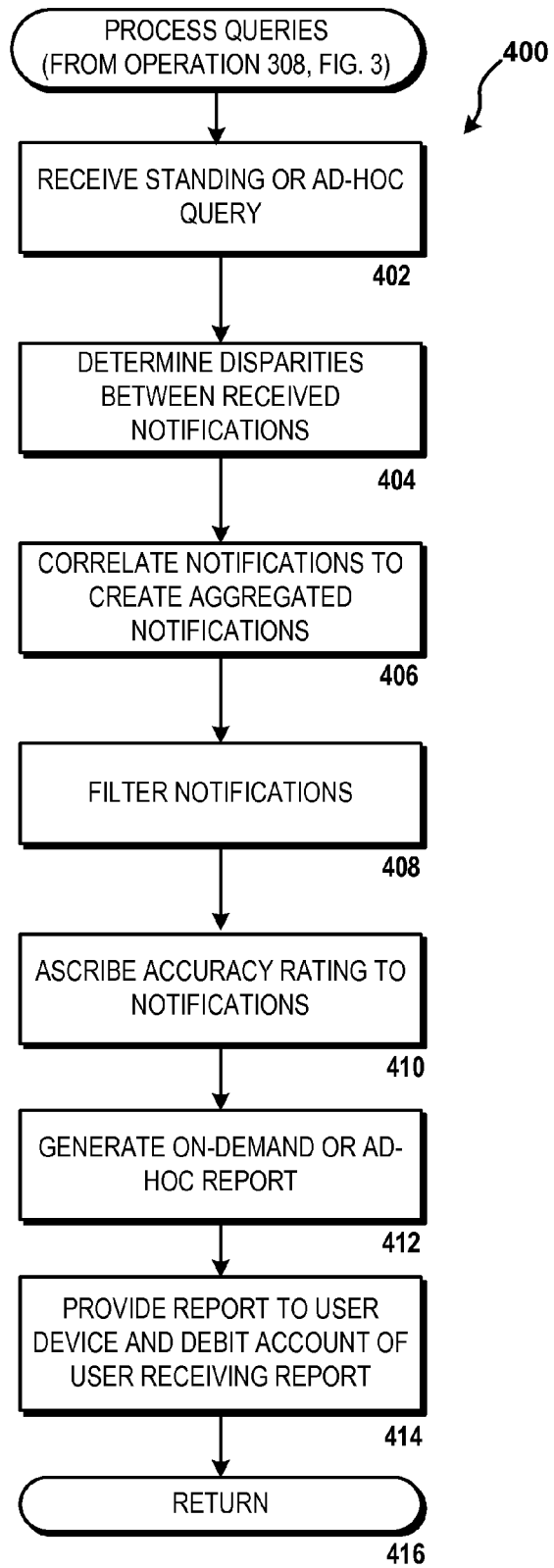
FIG. 4 is a flow diagram illustrating aspects of operations for processing queries and generating informational alerts in response thereto according to one embodiment disclosed herein.

Turning now to FIG. 4, a routine 400 will be described that depicts a process performed by the aggregation and notification server 106 for processing ad-hoc and standing queries according to one embodiment presented herein. The routine 400 begins at operation 402 where the query processing module 228 receives a standing or ad-hoc query from one of the user devices 112A-N. The routine 400 then proceeds to operation 404, where the notification analysis module 216 analyzes the notifications 108A-N and 110A-N and determines whether relevant disparities exist between the notifications. The routine 400 then proceeds to operation 406, where the correlation module 224 may correlate the notifications 108A-108N and 110A-110N to create aggregated notifications.

From operation 406, the routine 400 proceeds to operation 408, where the filter module 226 might filter the notifications in the manner described above. As also discussed above, the accuracy rating module 218 might also ascribe an accuracy rating to the notifications in the manner discussed above. As mentioned above, historical data and past trends might be utilized to compute the accuracy rating.

From operation 410, the routine 400 proceeds to operation 412, where the results of the queries are generated. The query results may be formatted in a format suitable for transmission to one of the user devices 112A-112N as an alert 114. The alert 114 might then be transmitted to the appropriate user device 112 at operation 414. Depending upon the compensation data 222 that the notification has been annotated with, an account associated with a user of the user device 112 that will receive the alert 114 might be debited. From operation 416, the routine 400 may return to operation 302, described above.

FIG. 5 shows an illustrative computer architecture for a computer 500 capable of executing the software components described herein for generating improved informational alerts. The computer architecture shown in FIG. 5 illustrates a conventional desktop, laptop computer, or server computer and may be utilized to implement the aggregation and notification server 106 and to execute any of the other software components described herein.

The computer architecture shown in FIG. 5 includes a central processing unit 502 ("CPU"), a system memory 504, including a random access memory 506 ("RAM") and a read-only memory ("ROM") 508, and a system bus 510 that couples the memory to the CPU 502. A basic input/output system ("BIOS") containing the basic routines that help to transfer information between elements within the computer 500, such as during startup, is stored in the ROM 508. The computer 500 further includes a mass storage device 512 for storing an operating system 514, application programs, and other program modules, which will be described in greater detail below.

The mass storage device 512 is connected to the CPU 502 through a mass storage controller (not shown) connected to the bus 510. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable storage media can be any available computer storage media that can be accessed by the computer 500.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500. As used herein, the term computer-readable storage media does not encompass transitory signals.

According to various embodiments, the computer 500 may operate in a networked environment using logical connections to remote computers through a network such as the network 520. The computer 500 may connect to the network 520 through a network interface unit 516 connected to the bus 510. It should be appreciated that the network interface unit 516 may also be utilized to connect to other types of networks and remote computer systems. The computer 500 may also include an input/output controller 518 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 512 and RAM 506 of the computer 500, including an operating system 514 suitable for controlling the operation of a networked desktop, laptop, or server computer. The mass storage device 512 and RAM 506 may also store one or more program modules. In particular, the mass storage device 512 and the RAM 506 may store the communications module 208, the annotations module 204, the correlation module 224, and any or all of the other program modules described above. The mass storage device 512 and RAM 506 may also store other program modules and data.

In general, software applications or modules may, when loaded into the CPU 502 and executed, transform the CPU 502 and the overall computer 500 from a general-purpose computing system into a special-purpose computing system customized to perform the functionality presented herein. The CPU 502 may be constructed from any number of transistors or other discrete circuit elements, which may individually or collectively assume any number of states. More specifically, the CPU 502 may operate as one or more finite-state machines, in response to executable instructions contained within the software or modules. These computer-executable instructions may transform the CPU 502 by specifying how the CPU 502 transitions between states, thereby physically transforming the transistors or other discrete hardware elements constituting the CPU 502.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for generating informational alerts have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and storage mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for generating informational alerts, the method comprising performing computer-implemented operations for:
   receiving a plurality of notifications from a plurality of unmanaged devices;
   receiving a plurality of notifications from a plurality of managed services;
   at least one notification, as received from the unmanaged devices or the managed services, including data and an annotation regarding the data, the annotation being at least one of privacy data which specifies whether the data is permitted to be sent to a subscriber device or compensation data which specifies whether compensation is required to send the data to a subscriber device;
   reviewing any annotation of the at least one notification to determine if an alert based upon the notification is permitted to be sent to subscriber devices;
   if the alert is permitted to be sent to the subscriber devices then generating the alert based upon the notification and transmitting the alert to one or more subscriber devices;
   correlating at least some of the notifications from the unmanaged devices and the managed services to create a set of aggregated notifications, an aggregated notification of the set of aggregated notifications including at least one notification from an unmanaged device and at least one notification from a managed service;
ascribing an accuracy rating to the aggregated notification, and
wherein transmitting the alert further comprises transmitting the accuracy rating.

2. The computer-implemented method of claim 1, further comprising:
filtering the aggregated notifications so that only notifications containing certain information are considered.

3. The computer-implemented method as recited in claim 1, wherein correlating the notifications identifies one or more disparities that exist between the notifications received from the unmanaged devices and the notifications received from the managed services.

4. A computer-readable storage medium having computer-executable instructions stored thereupon which, when executed by a computer, cause the computer to:
receive a plurality of notifications from a plurality of unmanaged devices;
receive a plurality of notifications from a plurality of managed services;
at least one notification, as received from the unmanaged devices or the managed services, including data and an annotation regarding the data, the annotation being at least one of privacy data which specifies whether the data is permitted to be sent to a subscriber device or compensation data which specifies whether compensation is required to send the data to a subscriber device;
review any annotation of the at least one notification to determine if an alert based on the notification is permitted to be sent to subscriber devices;
correlate at least some of the notifications from the unmanaged devices and the managed services to create a set of aggregated notifications, an aggregated notification of the set of aggregated notifications including at least one notification from an unmanaged device and at least one notification from a managed service;
ascribe an accuracy rating to the aggregated notification; and
if the alert is permitted to be sent to subscriber devices then to generate the alert based upon the notification and to transmit the alert to one or more subscriber devices, wherein to transmit the alert further comprises to transmit the accuracy rating.

5. The computer-readable storage medium of claim 4, having further computer-executable instructions stored thereon which, when executed by the computer, cause the computer to:
filter the aggregated notifications so that only aggregated notifications containing certain information are considered.

6. The computer-readable storage medium of claim 4, wherein the computer-executable instructions stored thereon which cause the computer to correlate the notifications also cause the computer to identify one or more disparities that exist between the notifications received from the unmanaged devices and the notifications received from the managed services.

7. A computer-readable storage medium having computer-executable instructions stored thereupon which, when executed by a computer, cause the computer to:
receive a plurality of notifications from a plurality of unmanaged devices;
receive a plurality of notifications from a plurality of managed services;
at least one notification, as received from the unmanaged devices or the managed services, including data and an annotation regarding the data, the annotation being at least one of privacy data which specifies whether the data is permitted to be sent to a subscriber device or compensation data which specifies whether compensation is required to send the data to a subscriber device;
review any annotation of the at least one notification to determine if an alert based upon the notification is permitted to be sent to subscriber devices;
if the alert is permitted to be sent to the subscriber devices then to generate the alert based upon the notification and to transmit the alert to one or more subscriber devices;
correlate at least some of the notifications from the unmanaged devices and the managed services to create a set of aggregated notifications, an aggregated notification of the set of aggregated notifications including at least one notification from an unmanaged device and at least one notification from a managed service;
ascribe an accuracy rating to the aggregated notification, and wherein to transmit the alert further comprises to transmit the accuracy rating;
wherein the privacy data defines whether the notifications is permitted to be shared and wherein the compensation data defines one or more financial terms upon which the notifications may be shared.

8. The computer-readable storage medium of claim 7, having further computer-executable instructions stored thereon which, when executed by the computer, cause the computer to:
filter the notifications so that only notifications containing certain information are considered.

9. The computer-readable storage medium of claim 8, wherein the computer-executable instructions stored thereon which cause the computer to correlate the notifications also cause the computer to identify one or more disparities that exist between the notifications received from the unmanaged devices and the notifications received from the managed services.

* * * * *